Jan. 21, 1958 P. J. BENDT 2,820,298
OPTICAL COMPARATOR
Filed Feb. 2, 1953 4 Sheets-Sheet 2
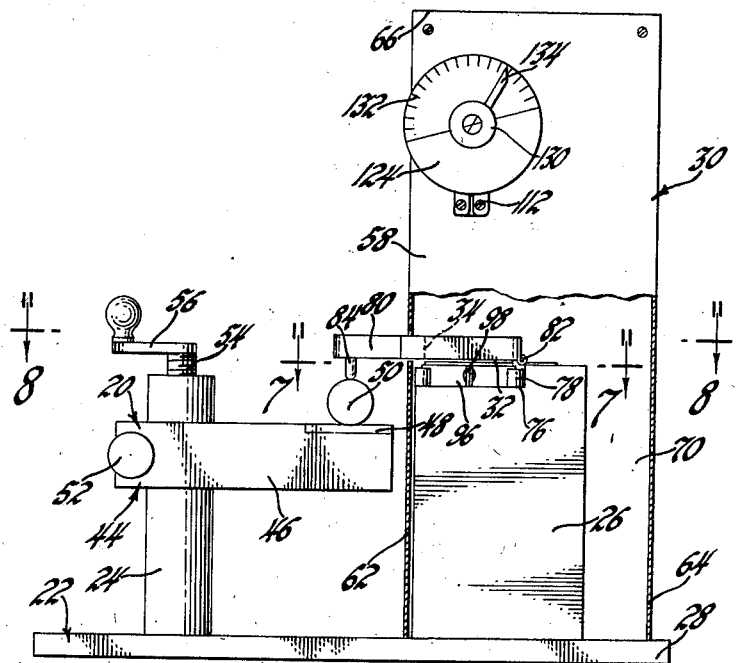
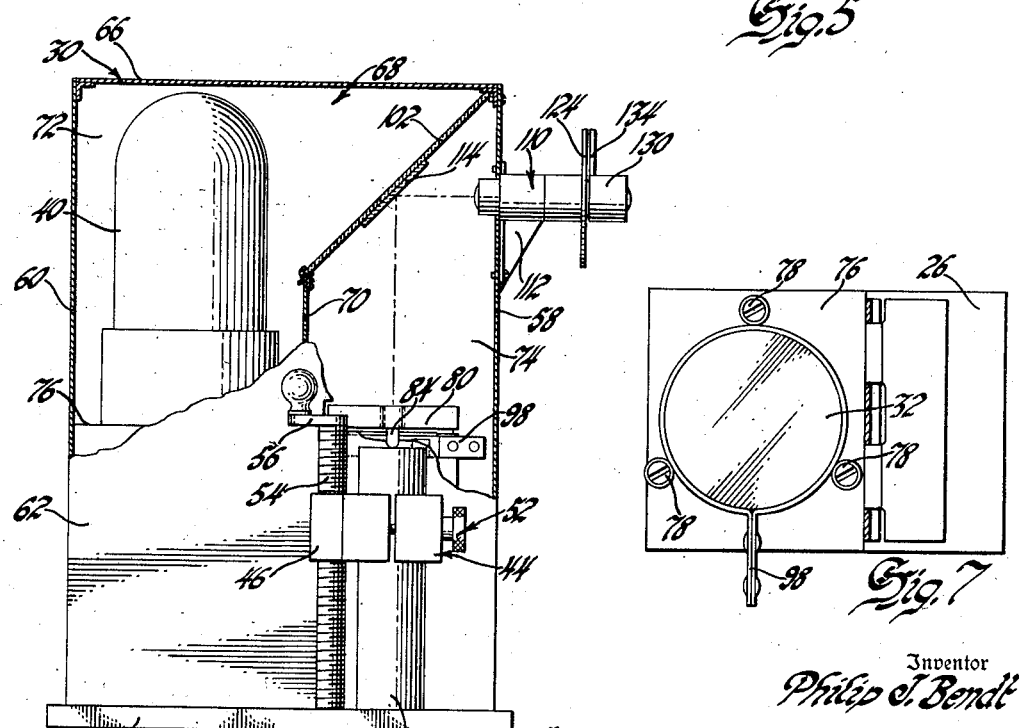
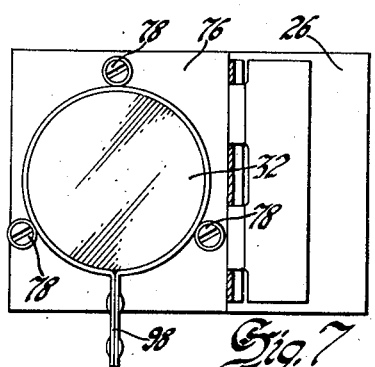
Inventor
Philip J. Bendt
By Willits, Helwig & Gaillio
Attorney

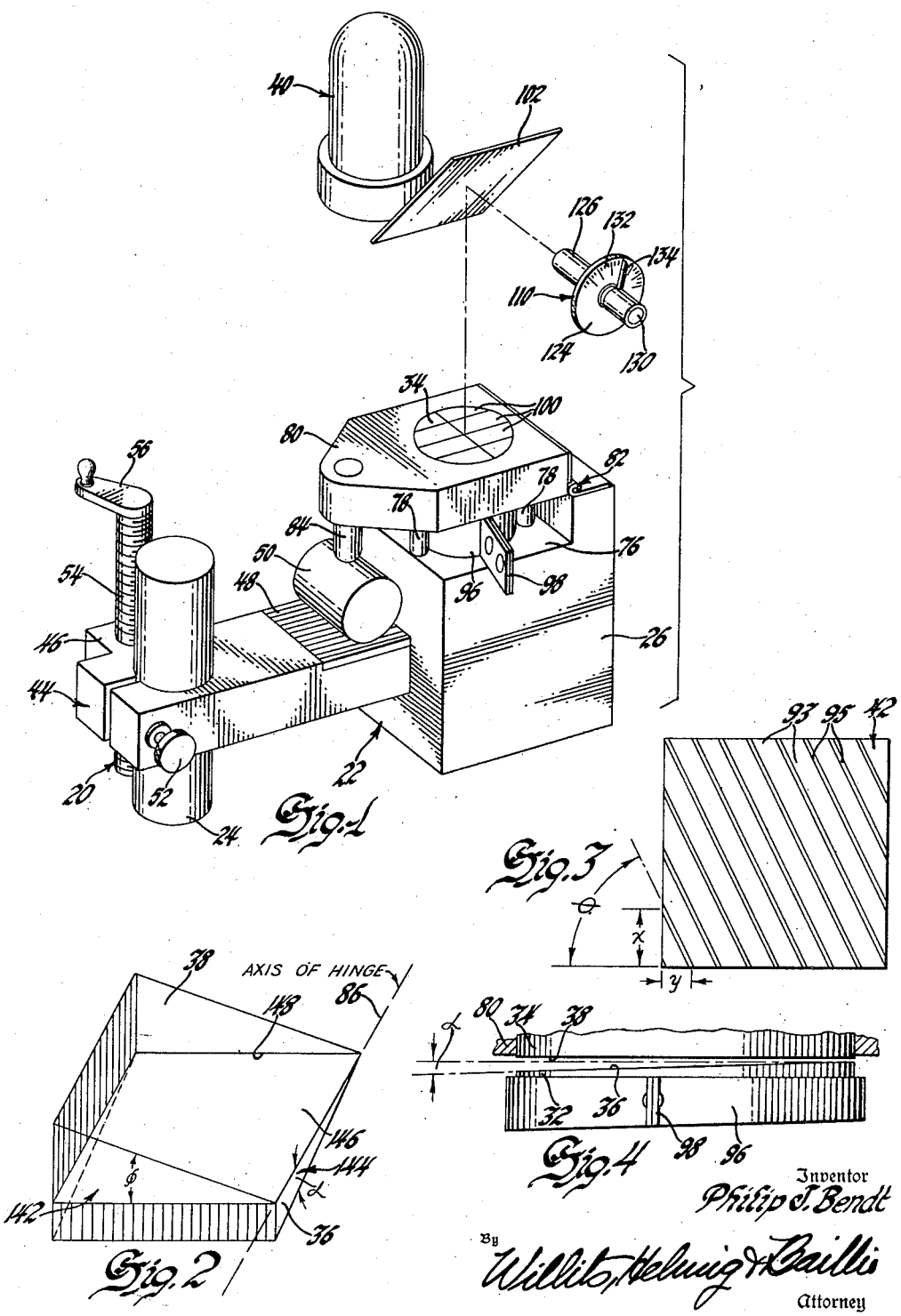

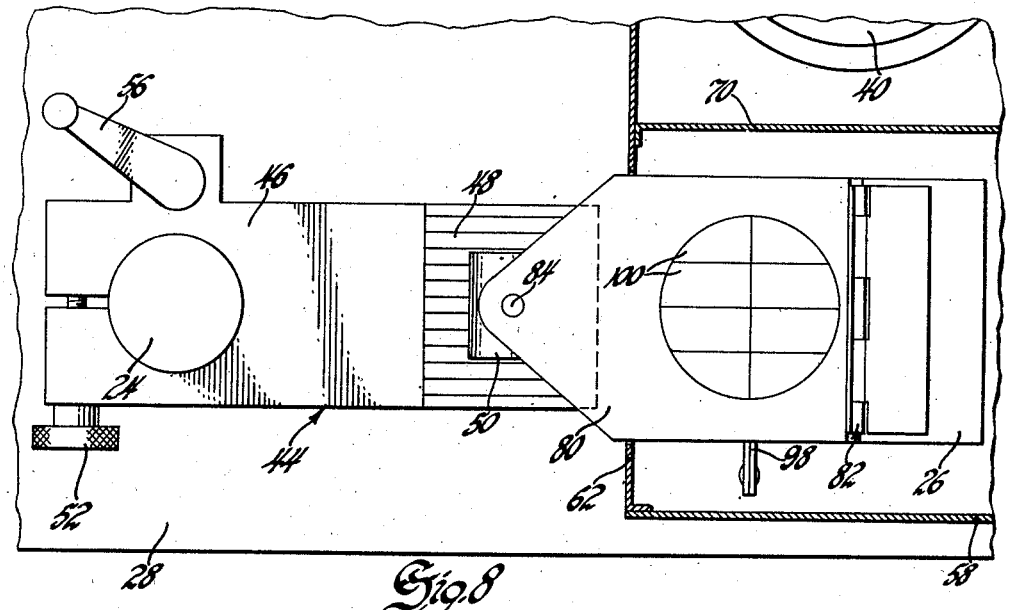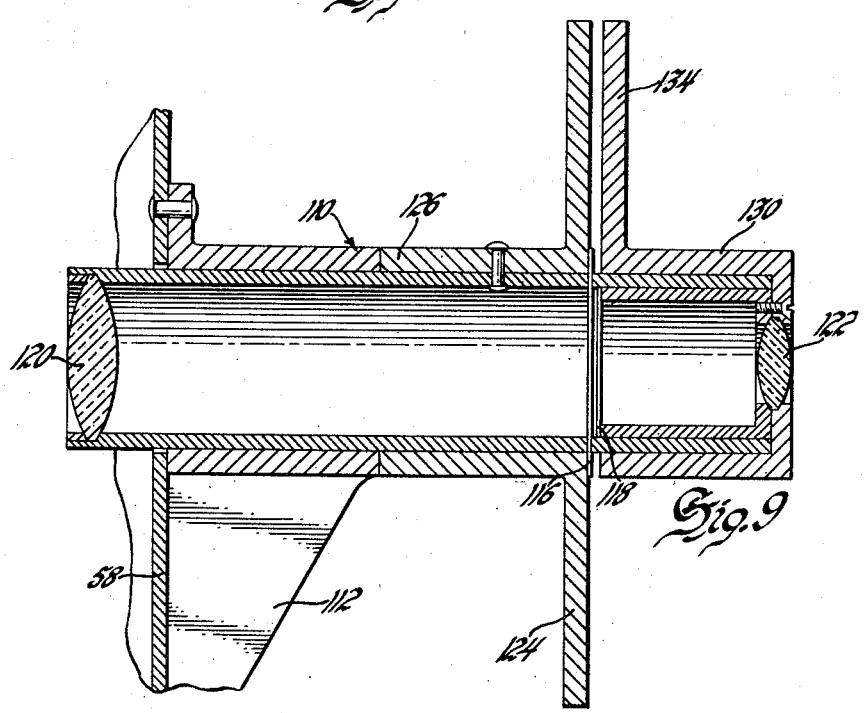

Jan. 21, 1958 P. J. BENDT 2,820,298
OPTICAL COMPARATOR
Filed Feb. 2, 1953 4 Sheets-Sheet 4

Inventor
Philip J. Bendt
By Willis, Helmig & Baillio
Attorney

United States Patent Office 2,820,298
Patented Jan. 21, 1958

2,820,298

OPTICAL COMPARATOR

Philip J. Bendt, Detroit, Mich., assignor to General Motors Corporation, Detroit, Mich., a corporation of Delaware Application February 2, 1953, Serial No. 334,533

20 Claims. (Cl. 33—149)

The present invention relates to optical means for precisely comparing the dimensions of an object with the dimensions of a standard of known size, and more particularly, to optical means for comparing dimensions by determining the rotational displacement of the Newtonian fringes present in a light interference pattern formed between a pair of optically flat surfaces.

One of the most accurate methods of lineal measurement employs a light interference pattern which is created between a pair of optically flat surfaces. In the past, it has been the practice to position a transparent member having an optically flat surface thereon so that the surface simultaneously engages the top of a standard of known size and the object to be measured. When a source of monochromatic light illuminates the member, a pattern of so-called Newtonian fringes will be formed as a result of the light interference that is created in the air wedge between the top of the standard and the optically flat surface. The spacing of the fringes is a function of the angle of the air wedge. Therefore, by observing the number of fringes within a specified distance it is possible by means of trigonometry to determine the relative difference between the standard of known size and the object of unknown size. Although this method provides an accurate comparison, the boundaries of the bright and dark fringes are not well defined and, as a result, it is very difficult to obtain an accurate measurement of the precise location of the fringes. Moreover, it is very difficult to control the sensitivity of this method of measurement.

It is proposed to provide an optical comparator for comparing the size of one object with the size of a standard of known dimension by observing the movement of a light interference pattern created between a pair of members having optically flat surfaces thereon. One of the members may be mounted on a stationary frame while the other member may be mounted on a lever so that the optically flat surfaces are adjacent and directly opposed to each other. The inner end of the lever may be supported by a hinge rigidly mounted on the frame and having a fixed axis of rotation while the outer end of the lever is adapted to engage the standard or object under comparison. Moving the outer end of the lever a distance corresponding to the difference in the size of the object and the standard will cause the interference pattern to move a distance indicating this difference in size. In order to allow the optical comparator to measure objects of varying sizes it is also proposed to support the object or standard under comparison on a work surface which may be moved with respect to the axis of the hinge supporting the lever.

It is further proposed to provide an optical comparator wherein a member having an optically flat surface thereon is mounted adjacent a second member having an optically flat surface thereon, and as one of said members is displaced by an object to be measured, said member will pivot about an axis which will cause the Newtonian fringes formed between the optically flat surfaces to appear to rotate. This may be accomplished by placing the axis of rotation of the hinge askew to one of the surfaces. Moreover, it is also proposed to provide an optical comparator in which the sensitivity thereof can readily be increased or decreased.

In the drawings:

Figure 1 is a diagrammatic view in perspective of the component parts of a comparator embodying the present invention.

Figure 2 is a schematic view of the air wedge which is formed between the adjacent optically flat surfaces.

Figure 3 is a schematic view showing the angular disposition of the Newtonian fringes comprising the interference pattern which is formed between the optically flat surfaces.

Figure 4 is an elevational view of the optical members showing the inclined relationship of the optically flat surfaces thereon.

Figure 5 is a front elevational view of a comparator embodying the present invention, a portion thereof being broken away to more clearly show the parts.

Figure 6 is a side elevational view of the comparator shown in Figure 5, a portion thereof being broken away.

Figure 7 is a view taken substantially along the plane of line 7—7 of Figure 5.

Figure 8 is a view on an enlarged scale taken substantially along the plane of line 8—8 of Figure 5.

Figure 9 is a vertical cross-section, on an enlarged scale, of the telescope.

Figure 10:
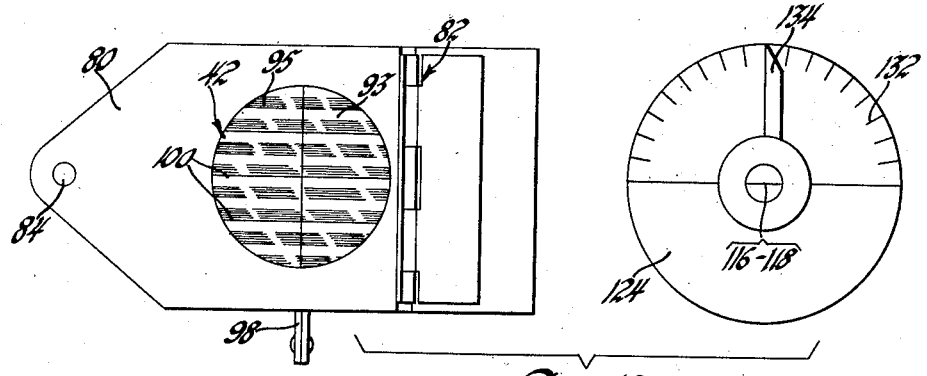
Figure 10 is a view showing the disposition of the Newtonian fringes and the telescope after the comparator has been correctly calibrated.
Figure 11:
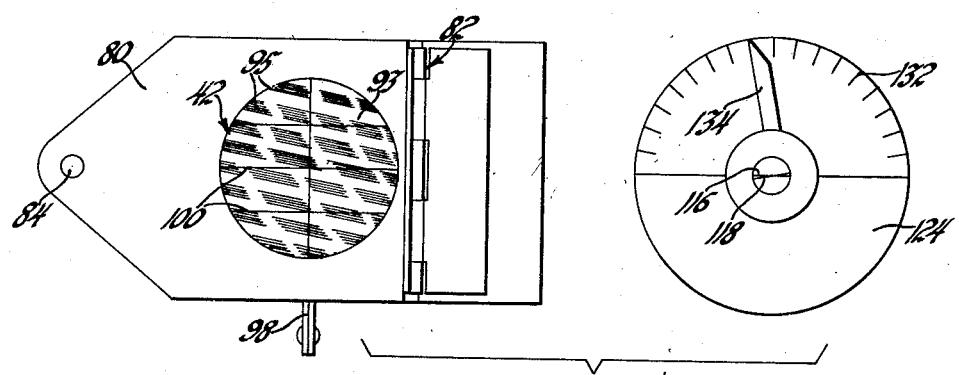
Figure 11 is a view similar to that of Figure 10 showing the disposition of the Newtonian fringes and the telescope when an unknown object is in position for comparison.

Referring to the drawings in more detail, an optical comparator 20 embodying the present invention has a supporting structure 22 which may comprise a base 28 having a substantially vertical pillar 24 on one end and a mounting member 26 on the other end. The mounting member 26 is contained in an enclosure 30 and supports a pair of optical members 32 and 34. These members are vertically spaced from each other and have optically flat surfaces 36 and 38 which are adjacent and directly opposed. Thus when they are illuminated by a suitable lamp 40, an interference pattern 42 will be created therebetween.

An anvil or elongated arm 44 may be slidably mounted on the pillar. The arm 44 is substantially horizontal and extends toward the enclosure 30. The end of the arm 44 nearest the enclosure 30 may be provided with a work surface 48 that is adapted to support the object 50 under comparison. To reduce the possibility of error the work surface 48 should be as flat as possible and preferably polished. Such an arrangement will tend to eliminate a change in elevation of the object 50 should its position on the work surface 48 vary. In order to minimize errors resulting from movement of the anvil 44, it is desirable to provide locking means such as a thumb screw 52 for securing the anvil 44 in position on the pillar 24. To facilitate movement of the anvil 44, a screw 54 having one end thereof seated on the base 28 may be positioned substantially parallel to the pillar 24 so as to threadably engage the arm 46. Thus to raise or lower the arm 44, the thumb screw 52 is loosened until the arm 44 is free to slide along the pillar 24. A crank 56 on the end of the screw 54 is then manually rotated until the arm 44 has reached the correct elevation at which time the thumb screw 52 is again tightened.

The enclosure 30 comprises a front wall 58, rear wall 60, and side walls 62 and 64 and a top wall 66 which are secured together to form a chamber 68. A substantially vertical partition 70 extends across the lower portion of the enclosure 30 and divides the chamber 68 into two compartments 72 and 74. One of the compartments 72 contains the lamp 40 which is secured to a shelf 76 while the other compartment 74 contains the mounting member 26 which is rigidly secured to the base 28 and projects upwardly therefrom.

Figure 12:
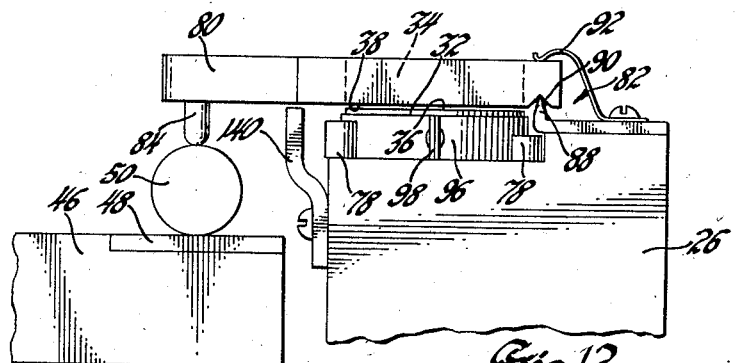
Figure 12 is an elevational view, on an enlarged scale, of the optical members and the mountings therefor.

The mounting member 26 has a recess 76 formed in one side thereof that supports the lower optical member 32 so that the optically flat surface thereon is positioned on top. A plurality of parts 78 project upwardly from the recess to retain the optical member 32 in position. A hinge 82, of any suitable construction, may be secured to the mounting member 26 so as to rotatably support one end of an elongated lever 80. The other end of the lever 80 may be provided with a downwardly projected contact finger 84 which is adapted to engage any objects 50 that may be placed on the work surface 48 of the anvil 44. It should be noted that the accuracy of the comparator 20 is dependent upon the axis 86 of the hinge 82 remaining in a fixed position at all times. Accordingly, a knife blade 88 as shown in Figure 12 may be provided on the member 26 so as to engage a notch 90 on the under side of the lever 80. A plurality of leaf springs 92 may engage the lever 80 and retain it in position on the knife blade 88. Thus the lever 80 may pivot about the knife edge 88 and cause the interference pattern to move. If it is desired to cause the pattern to rotate the axis 86 of the hinge 82 may be inclined so that it will intersect the plane of at least one of the optically flat surfaces at an oblique angle alpha.

The upper optical member 34 which is preferably transparent is rigidly secured in position in the lever 80 so that the optically flat surface 38 thereon faces down directly onto the lower optically flat surface 36. This will place the two optically flat surfaces in juxtaposition and the application of the proper illumination will create a light interference pattern 42 between the two surfaces that comprises a series of Newtonian fringes 93 and 95 or lines of light and dark intensity. The sensitivity of the comparator 20 is a function of the angle at which the axis 86 of the hinge 82 intersects the plane of the surfaces 36 and 38. In the present instance the axis of rotation 86 is parallel to the plane of surface 38 and therefore the sensitivity will be a function of the angle alpha or the angle at which the axis 86 of the hinge 82 intersects the plane of surface 36. Therefore, it is desirable to provide means for varying this angle. This may be achieved by any suitable means such as moving the position of the axis 86 or changing the slope of one of the flat surfaces 36 and 38. In the present instance the lower optically flat surface 36 is moved. The lower optical member 32 has a clamping ring 96 on the exterior thereof that fits snugly between the posts 78 in the recess 76 positioned in the side of the mounting member. A lever 98 projecting from the side of the ring 96 forms a handle to facilitate rotating the lower optical member 32. Since the optically flat surface 36 on the top of the lower member 32 is not parallel to the bottom, as the handle 98 is moved the member 32 will rotate about a line oblique to the optically flat surface 36. This will be effective to vary the angle alpha of intersection of the axis 86 and accordingly the sensitivity of the comparator 20. The spacing of the fringes 93 and 95 is an index of the comparator's sensitivity. Therefore, by providing a plurality of parallel spaced lines 100 on one of the optical members 34, it is possible to readily determine the correct spacing of the fringes 93 and 95 and thereby insure the correct sensitivity.

In order to produce a light interference pattern 42 having clearly defined fringe lines 93 and 95, it is advantageous to utilize a source of substantially monochromatic light such as helium or sodium vapor lamp 40. In order to minimize the effects of parallax, it is preferable that the interference pattern be created by light rays which enter the optical members 32 and 34 form as nearly normal to the optically flat surfaces 36 and 38 as possible and that the pattern 42 be observed from a direction as nearly normal to the surfaces 36 and 38 as possible. The light may be placed off center from the optical members 32 and 34, in which case a suitable refracting means is positioned above the optical members. A piece of opal glass 102 which bends light passing therethrough at right angles may be mounted between the upper end of the partition 70 and the upper edge of the front wall 58 to bend the light vertically down onto the optical members.

The Newtonian fringe 93 and 95 in the interference pattern are a result of the phase relationship of the light reflected from each of the optically flat surfaces 36 and 38. The dark lines 95 are the result of destructive interference and they occur where the distance between the optically flat surfaces 36 and 38 is an odd multiple of one quarter of the wave length of the light involved. The bright lines 93 result from the light reflected from the two surfaces 36 and 38 being in phase and reinforcing each other. This occurs where the distance between the two surfaces is some multiple of one half of the wave length of the light involved. Since the surfaces 36 and 38 are optically flat, rays of light striking the surface in parallel relation will leave the surface in parallel relation. Therefore the surfaces are substantially planar and the light and dark lines 93 and 95 will be straight and parallel with each other. The fringes 93 and 95 will also be parallel with the line of intersection of the planes containing the two optically flat surfaces 36 and 38. As previously pointed out the axis of rotation 86 of the hinge 82 is oblique to at least one of the planes of the optical surfaces. Thus, as one of the members 32 or 34 pivots about this axis 86, the direction of the line of intersection will appear to rotate.

A viewing system is provided so that the pattern 42 will always be observed from substantially the same direction which is preferably normal to the optically flat surfaces 32 and 34. The viewing system comprises a conventional telescope 110 which is mounted in a horizontal position on the front wall 58 by means of a bracket 112. The telescope 110 is aimed at a small mirror 114 positioned on the back of the opal glass 102 and is focused on the interference pattern 42. The telescope 110 is provided with two independent cross-hairs 116 and 118 which are mounted between the objective 120 and pupilary lenses 122. The first cross-hair 116 is mounted to rotate with the flange 124 which projects radially from the barrel 126 of the telescope 110. The second cross-hair 118 is carried by the eye piece 130. By providing a scale 132 on the flange 124 and a pointer 134 on the eye piece 130, the relative position of the cross-hairs 116 and 118 may readily be ascertained. Thus, by separately aligning the cross-hairs with the fringes 93 and 95 before and after movement of the pattern 42, it is possible to determine the amount of rotational displacement of the pattern 42.

To make a comparison by means of the optical comparator 20, a standard 50 of known dimension is placed on the work surface 48 of the anvil 44. The crank 56 on the end of the screw 54 is then rotated so as to raise the anvil 44. This is continued until the standard 50 engages and lifts the contact finger 84. The comparator 20 is then calibrated to insure that the optical members 32 and 34 are correctly positioned for making a comparison by first adjusting the height of the anvil 44. As the anvil 44 causes the lever 80 to rise and fall, the direction of the fringes 93 and 95 will rotate. This adjustment is continued until the lines run as parallel as possible to the three lines 100 on the surface of the optical member 34. After the fringes have been lined up with the lines 100 on the optical members, the angle alpha is adjusted to vary the spacing of the fringes 93 and 95 until a designated number appears between the three lines 100. In the present instance this has arbitrarily been shown as four fringes. As previously stated, by turning the lever 98 to rotate the lower optical member 32, the direction of the slope can be effectively controlled. This will result in the angle alpha at which the axis 86 of the hinge 82 strikes the plane of the surface 36 to change. This will vary the spacing of the fringes 93 and 95 and thus the sensitivity of the comparator 20. It should be noted that, since the effective elevation of the lower optical member 32 will change as it is rotated, the height of the anvil 44 should be continuously adjusted during the calibration operation to maintain the fringes substantially parallel to the lines 100 at all times. After the comparator 20 has been adjusted to properly position the fringes with respect to the lines, the anvil 44 is locked in place by tightening the thumb screw 52. Although the direction of the fringes 93 and 95 is altered by moving the anvil 44 up or down, it may be difficult to place them precisely parallel to the three lines 100 on the optical flats. It is therefore desirable to make the flange 124 and cross-hair 116 adjustable to allow an accurate and reliable indexing of the position of the fringes when the standard piece 50 is in the comparator 20. After the flange has been adjusted to place the cross-hair 116 parallel to the fringes 93 and 95, the standard piece is removed from under the contact finger 84 thus allowing the lever 80 to rest on the stop 140. The object 50 of unknown size is next placed on the work surface 48 in engagement with the contact finger 84. If the dimension of the object 50 differs from that of the standard, the contact finger 84 will be in a different elevation. This in turn will cause the lever 80 to raise or lower the upper optical member 34 and change the direction of the interference pattern 42. After the piece 50 under examination is properly placed, the eye piece 130 of the telescope 110 is rotated until the cross-hair 118 thereon is lined up with the new direction of the fringes 93 and 95. The flange 124 remains stationary during this operation. The pointer 134 which rotates with the eye piece 130 will then indicate the amount of relative rotation of the fringe pattern 42. The scale 132 on the flange 124 may be calibrated to read in degrees or directly in microinches. If the scale 132 is graduated in degrees, the difference between the standard and the unknown piece may readily be calculated. It is apparent that this comparator 20 may be employed for making precise comparisons although it is particularly adapted for inspection work where it is necessary to repeatedly measure objects of substantially the same dimensions. Once the comparator 20 has been properly adjusted, any number of objects may be compared with the original standard without the necessity of further adjustment. However, it may be desirable to occasionally insert the standard piece to insure that the comparator 20 is not out of adjustment.

For an understanding of how to calculate the size of the unknown piece 50, reference may be had to Figure 2 which is a diagrammatic view of the air space between the lower and upper optically flat surfaces 36 and 38. As a matter of convenience, this space may be considered as being comprised of upper 142 and lower 144 wedges of air. The upper wedge 142 is formed between the lower surface 38 of the upper optical member 34 and a horizontal reference plane 146. The bottom wedge 144 is formed between the upper surface 36 of the lower optical member 32 and the same reference plane 146. The reference plane 146 is defined by two lines, the axis 86 of the hinge 82 and a line 148 which is perpendicular to the axis 86 and intersects it, and which is also parallel to the top surface 36 of the bottom optical flat member 32. The angle alpha is the angle between the reference plane 146 and the top surface 36 of the bottom member 32. Although this angle is adjustable by rotating the lower optical member 32, it is set at the time that the instrument 20 is calibrated and remains fixed through the comparison. As previously pointed out the sensitivity of the instrument is a function of this angle alpha. The angle phi is the angle formed between the reference plane 146 and the lower surface 38 of the upper optical member 34. This angle is set at zero when the gauge is calibrated but it varies during the gauging operation. The angle theta (Figure 3) is the angle at which the fringes 93 and 95 strike the edge of the flat and is determined by the angles alpha and phi of the two air wedges 142 and 144.

To calculate the dimension of the unknown piece 50, the following equations apply:

$$\tan \theta = x/y$$

where $x$ = vertical space between fringes (Figure 3) where $y$ = horizontal space between fringes. Assuming that the optical members are square and have sides of length L and the wave length of the light is represented by $\lambda$.

$$\tan \alpha = \frac{L/x \cdot \lambda/2}{L} \text{ or } x = \frac{\lambda}{2 \tan \alpha}$$

and $$\tan \phi = \frac{L/y \cdot \lambda/2}{L} \text{ or } y = \frac{\lambda}{2 \tan \phi}$$

thus $$\tan \theta = x/y = \frac{\tan \phi}{\tan \alpha} \text{ or } \tan \phi = \tan \alpha \cdot \tan \theta$$

since $$\tan \alpha = A \cdot \lambda/2$$

where A is the number of fringes per inch. (In the present embodiment, this was set at 4 during calibration.) Therefore, $$\tan \phi = \frac{\lambda A}{2} \tan \theta$$

and the difference in the dimension between the standard and unknown object is $$\Delta D = \frac{\lambda A B \tan \theta}{2}$$

where B is the distance from the hinge axis to the contact finger.

While the foregoing description and figures have been confined to one embodiment, it will be apparent to those skilled in the art that numerous modifications may be made without departing from the spirit thereof. Accordingly, it is to be understood that the foregoing is to be considered as illustrative only and in no way restrictive, reference being had to the appended claims to determine the scope of the invention.

What is claimed is:

1. In an optical comparator the combination of a member having a substantially optically flat surface thereon, and a second member having a substantially optically flat surface thereon which is in juxtaposition to said first optically flat surface, pivot means supporting said second member for movement about an axis of rotation, said axis being disposed obliquely to at least one of said optically flat surfaces.

2. In an optical comparator the combination of a member having a substantially optically flat surface thereon, a second member having a substantially optically flat surface thereon which is in juxtaposition to said first optically flat surface, hinge means supporting one of said members for rotation about an axis which is oblique to the plane of at least one of said surfaces, and a source of light positioned adjacent said members and illuminating said optically flat surfaces and creating a light interference pattern therebetween.

3. In an optical comparator the combination of a stationary structure, a first member seated on said structure and having a substantially optically flat surface thereon, a second member having a substantially optically flat surface thereon in juxtaposition to said first optically flat surface, a source of substantially monochromatic light positioned adjacent said members and illuminating said optically flat surfaces to thereby create a light interference pattern therebetween, and hinge means secured to said stationary structure and carrying said second member, the axis of rotation of said hinge being oblique to one of said surfaces whereby rotation of said second member about said axis will cause said interference pattern to appear to rotate.

4. In an optical comparator the combination of a stationary structure, a first member seated on said structure and having a substantially optically flat surface thereon, a second member having a substantially optically flat surface thereon in juxtaposition to said first optically flat surface, a source of substantially monochromatic light positioned adjacent said members and illuminating said optically flat surfaces to thereby create a light interference pattern therebetween, hinge means secured to said second member, said hinge means having an axis of rotation intersecting the plane of one of said optically flat surfaces at an oblique angle, and adjusting means for varying the angle at which said axis intersects said optically flat surface.

5. In an optical comparator the combination of a stationary structure, a first member seated on said structure and having a substantially optically flat surface thereon, a second member having a substantially optically flat surface thereon in juxtaposition to said first optically flat surface, a source of substantially monochromatic light positioned adjacent said members and illuminating said optically flat surfaces to thereby create a light interference pattern therebetween, hinge means secured to said second member, said hinge means having an axis of rotation intersecting the plane of one of said optically flat surfaces at an oblique angle, and means for rotating one of said members about said axis oblique to the optically flat surface on said member to thereby vary the angle at which said axis intersects said optically flat surface.

6. In an optical comparator the combination of a stationary structure, a first member having a base thereon seated on said structure, said member having a substantially optically flat surface thereon inclined to said base, a second member having a substantially optically flat surface thereon in juxtaposition to said first optically flat surface, a source of substantially monochromatic light positioned adjacent said members and illuminating said optically flat surfaces and creating a light interference pattern therebetween, hinge means secured to said stationary structure and rotatably supporting said second member, said hinge means having an axis of rotation intersecting the plane of said first optically flat surface at an oblique angle, and means for rotating said first member about an axis substantially normal to said base to thereby vary the angle between the axis of said hinge and said plane.

7. In an optical comparator the combination of a stationary structure, a first member seated on said stationary structure and having a substantially optically flat surface thereon, a hinge on said stationary structure, a lever having one end thereof supported by said hinge, a second member carried by said lever and having an optically flat surface thereon in juxtaposition to said first surface, said hinge having an axis of rotation which is positioned oblique to the plane of one of said optically flat surfaces.

8. In an optical comparator the combination of a stationary structure, a first member seated on said stationary structure and having a substantially optically flat surface thereon, a hinge on said stationary structure, a lever having one end thereof supported by said hinge, a second member carried by said lever and having an optically flat surface thereon in juxtaposition to said first surface, said hinge having an axis of rotation which is positioned to intersect the plane of one of said optically flat surfaces at an oblique angle, and means associated with one of said members for varying the angle at which said axis intersects said plane.

9. In an optical comparator the combination of a stationary sctructure, a first member seated on said stationary structure and having a substantially optically flat surface thereon, a hinge on said stationary structure, a lever having one end thereof supported by said hinge, a second member carried by said lever and having an optically flat surface thereon in juxtaposition to said first surface, said hinge having an axis of rotation which is positioned to intersect the plane of one of said optically flat surfaces at an oblique angle, and means for rotating one of said members about an axis oblique to the optically flat surface on said member.

10. In an optical comparator the combination of a stationary structure, a first member seated on said stationary structure and having an optically flat surface thereon, means for rotating said first member about an axis oblique to said optically flat surface, a hinge on said stationary structure, a lever having one end thereof supported by said hinge, a member carried by said lever and having an optically flat surface thereon in juxtaposition to said first optically flat surface, and a source of light positioned adjacent said members and illuminating said optically flat surfaces to create a light interference pattern therebetween, said hinge having an axis of rotation positioned to intersect the plane of one of said optically flat surfaces at an oblique angle whereby rotation of said lever will cause said interference pattern to appear to rotate.

11. In an optical comparator the combination of a stationary structure, a first member seated on said stationary structure and having an optically flat surface thereon, means for rotating said first member about an axis oblique to said optically flat surface, a hinge on said stationary structure, a lever having one end thereof supported by said hinge, a member carried by said lever and having an optically flat surface thereon in juxtaposition to said first optically flat surface, a source of substantially monochromatic light positioned adjacent said members and illuminating said optically flat surfaces to create a light interference pattern therebetween, said hinge having an axis of rotation positioned to intersect the plane of one of said optically flat surfaces at an oblique angle whereby rotation of said lever will cause said interference pattern to appear to rotate, and means to measure the amount of said rotation.

12. In a gauge for comparing a dimension of an object with that of a standard of known size, the combination of a stationary structure having a work surface thereon adapted to support said object and said standard, a member supported by said stationary structure and having an optically flat surface thereon, a hinge supported by said stationary structure, a lever having a contact element adjacent one end thereof which is adapted to engage said object and said standard when they are positioned on said work surface, the opposite end of said lever being supported by said hinge, a second member carried by said lever and having an optically flat surface thereon adjacent and directly opposed to said first optically flat surface, said hinge having an axis oblique to at least one of said optically flat surfaces, and a source of light positioned adjacent said members to illuminate said optically flat surfaces and thereby create a light interference pattern therebetween.

13. In a gauge for comparing a dimension of an object with that of a standard of known size, the combination of a stationary structure having a work surface thereon adapted to support said object and said standard, a member supported by said stationary structure and having an optically flat surface thereon, a hinge supported by said stationary structure, a lever having a contact element adjacent one end thereof adapted to engage said object and said standard when they are positioned on said work surface, the opposite end of said lever being supported by said hinge, a second member carried by said lever and having an optically flat surface thereon in juxtaposition to said first optically flat surface, and a source of substantially monochromatic light positioned adjacent said members to illuminate said optically flat surfaces and thereby create a light interference pattern therebetween, said hinge having an axis of rotation which is oblique to one of said optically flat surfaces, whereby displacement of said contact element will cause said interference pattern to appear to rotate, and means for observing the amount of rotation of said interference pattern.

14. In a gauge for comparing a dimension of an object with that of a standard of known size, the combination of a stationary frame, a work surface supported by said frame and adapted to carry said object and said standard, a member supported by said stationary frame and having an optically flat surface thereon, a hinge supported by said stationary frame, a lever having a contact element adjacent one end thereof adapted to engage said object and said standard when they are positioned on said work surface, the opposite end of said lever being supported by said hinge, a second member carried by said lever and having an optically flat surface thereon adjacent and directly opposed to said first optically flat surface, said hinge having an axis oblique to at least one of said surfaces, a source of substantially monochromatic light positioned adjacent said members to illuminate said optically flat surfaces and thereby create a light interference pattern therebetween.

15. In a gauge for comparing a dimension of an object with that of a standard of known size, the combination of a stationary structure having a work surface thereon adapted to support said object and said standard, a member supported by said stationary structure and having an optically flat surface thereon, a hinge supported by said stationary structure, a lever having a contact element adjacent one end thereof adapted to engage said object and said standard when they are positioned on said work surface, the opposite end of said lever being supported by said hinge, a second member carried by said lever and having an optically flat surface thereon in juxtaposition to said first optically flat surface, a source of substantially monochromatic light positioned adjacent said members to illuminate said optically flat surfaces, and thereby create a light interference pattern, said hinge having an axis of rotation which intersects the plane of one of said optically flat surfaces at an oblique angle whereby displacement of said contact element a distance corresponding to the difference between said standard and said object will cause said interference pattern to appear to rotate, means for rotating one of said optically flat surfaces about a line oblique to the optically flat surface on said member to thereby vary the angle at which said axis intersects the plane of said surface, and means for observing the amount of rotation of said pattern.

16. In an optical comparator the combination of a first member having a substantially optically flat surface thereon, a second member having a substantially optically flat surface thereon which is adjacent and directly opposed to said first optically flat surface, and a source of light positioned adjacent said members and creating a light interference pattern therebetween, at least one of said members being movably supported by a mounting means that positions said surfaces relative to each other so that relative movement therebetween will cause said light interference pattern to appear to rotate.

17. In an optical comparator the combination of a member having a substantially optically flat surface thereon, a second member having a substantially optically flat surface thereon which is adjacent and directly opposed to said first optically flat surface, a source of light positioned adjacent said members thereby illuminating said optically flat surfaces and creating a light interference pattern therebetween and mounting means movably supporting at least one of said members to position said surfaces to each other so that relative movement therebetween will cause said interference pattern to appear to rotate.

18. In a gauge for comparing a dimension of an object with that of a standard of known size, the combination of a stationary frame structure, a member positioned on said frame structure and having an optically flat surface thereon, a work platform adjustably mounted on said frame structure for supporting said object and said standard, a lever having a contact element adjacent one end thereof adapted to engage said object and said standard when they are positioned on said work platform, a hinge disposed on said frame structure and supporting the other end of said lever for pivoting about the axis of said hinge, a second member carried by said lever and having an optically flat surface thereon adjacent and directly opposed to said first optically flat surface, at least one of said surfaces being oblique to said axis, and a source of light positioned adjacent said members to illuminate said optically flat surfaces and thereby creating a light interference pattern therebetween.

19. In a gauge for comparing a dimension of an object with that of a standard of known size, the combination of a stationary frame structure, an arm adjustably supported on said frame, said arm having a work surface thereon adapted to support said object and said standard, a member positioned on said frame structure and having an optically flat surface thereon, a lever having a contact element adjacent one end thereof adapted to engage said object and said standard when they are positioned on said work surface, a hinge disposed on said frame structure and supporting the other end of said lever for pivoting about the axis of said hinge, said work surface being adjustable with respect to the axis of said hinge, a second member carried by said lever and having an optically flat surface thereon which is adjacent and directly opposed to said first optically flat surface, and a source of light positioned adjacent said members to illuminate said optically flat surfaces and thereby create a light interference pattern therebetween, said member being mounted so that movement of said members about said axis will cause rotation of said pattern.

20. In a gauge for comparing a dimension of an object with that of a standard of known size, the combination of a stationary frame structure, an arm threadably supported on said frame, said arm having a work surface thereon adapted to support said object and said standard, a member positioned on said frame structure and having an optically flat surface thereon, a hinge disposed on said frame structure, a lever having a contact element adjacent one end thereof adapted to engage said object and said standard when they are positioned on said work surface, a second member carried by said lever and having an optically flat surface thereon adjacent and directly opposed to said first optically flat surface, and a source of substantially monochromatic light positioned adjacent said members to illuminate said optically flat surfaces and thereby create a light interference pattern therebetween, at least one of said surfaces being oblique to said axis.

References Cited in the file of this patent

UNITED STATES PATENTS

| | | |
|---|---|---|
| 1,824,153 | Jacobs | Sept. 22, 1931 |
| 2,450,839 | Merritt | Oct. 5, 1948 |
| 2,466,322 | Merritt | Apr. 5, 1949 |